United States Patent
Jang et al.

(10) Patent No.: US 7,903,974 B2
(45) Date of Patent: Mar. 8, 2011

(54) OPTICAL TRANSMISSION SYSTEM FOR TRANSMITTING SIGNAL OF E-BAND WITH OTHER BANDS

(75) Inventors: Ki-Wan Jang, Seoul (KR); Ki-Yeul Kim, Seoul (KR)

(73) Assignee: LS Cable Ltd., Seoul (KR)

( * ) Notice: Subject to any disclaimer, the term of this patent is extended or adjusted under 35 U.S.C. 154(b) by 965 days.

(21) Appl. No.: 11/587,830

(22) PCT Filed: Apr. 25, 2005

(86) PCT No.: PCT/KR2005/001188
§ 371 (c)(1), (2), (4) Date: Oct. 25, 2006

(87) PCT Pub. No.: WO2005/114877
PCT Pub. Date: Dec. 1, 2005

(65) Prior Publication Data
US 2007/0166040 A1 Jul. 19, 2007

(30) Foreign Application Priority Data
Apr. 27, 2004 (KR) ............... 10-2004-0029249

(51) Int. Cl.
*H04J 14/02* (2006.01)
*H04B 10/08* (2006.01)
(52) U.S. Cl. ............... 398/79; 398/33; 398/85
(58) Field of Classification Search .......... 398/30, 398/33, 85, 79
See application file for complete search history.

(56) References Cited

U.S. PATENT DOCUMENTS

| 6,205,268 B1 * | 3/2001 | Chraplyvy et al. ............ 385/24 |
| 6,292,289 B1 | 9/2001 | Sugaya et al. |
| 6,417,965 B1 * | 7/2002 | Ye et al. ............... 359/341.41 |
| 2003/0039008 A1 * | 2/2003 | Davies ....................... 359/130 |
| 2008/0292257 A1 * | 11/2008 | Kumano et al. ............. 385/127 |

FOREIGN PATENT DOCUMENTS

| JP | 56-106211 | 8/1981 |
| JP | 2002-243960 | 8/2002 |
| WO | WO 99/35522 | 7/1997 |

* cited by examiner

*Primary Examiner*—Nathan M Curs
(74) *Attorney, Agent, or Firm*—Jones Day

(57) ABSTRACT

Disclosed is an optical transmission system capable of transmitting optical signals of E-band and other bands through one optical fiber. The system includes a first thin film filter for receiving optical signals of E-band and other bands at both sides thereof respectively, and multiplexing the optical signals of both E-band and other bands by selectively transmitting wavelength ranges received at one side, reflecting wavelength ranges received at the other side, and then coupling the optical signals of both E-band and other bands; an optical fiber for transmitting the optical signals multiplexed by the first thin film filter to a receiving portion; and a second thin film filter for selectively separating and demultiplexing the E-band and other bands from the optical signals transmitted through the optical fiber.

9 Claims, 2 Drawing Sheets

[Fig. 1]
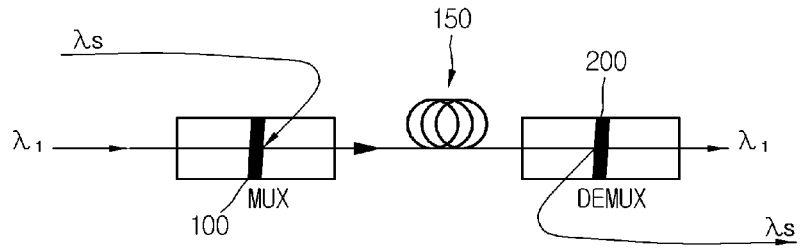
[Fig. 2]
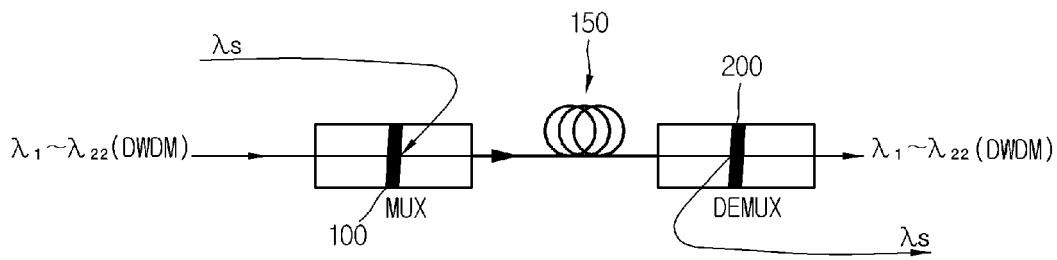
[Fig. 3]
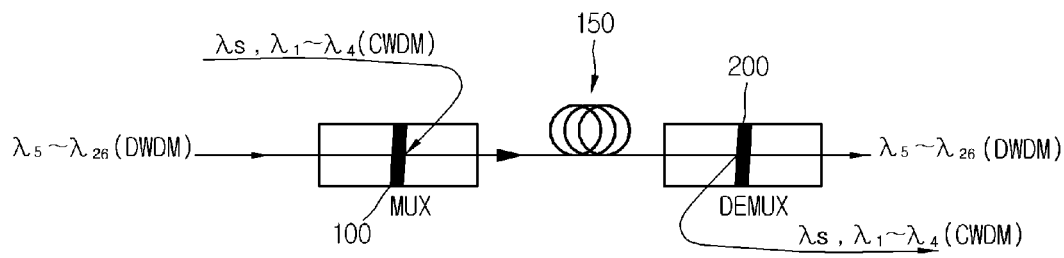
[Fig. 4]
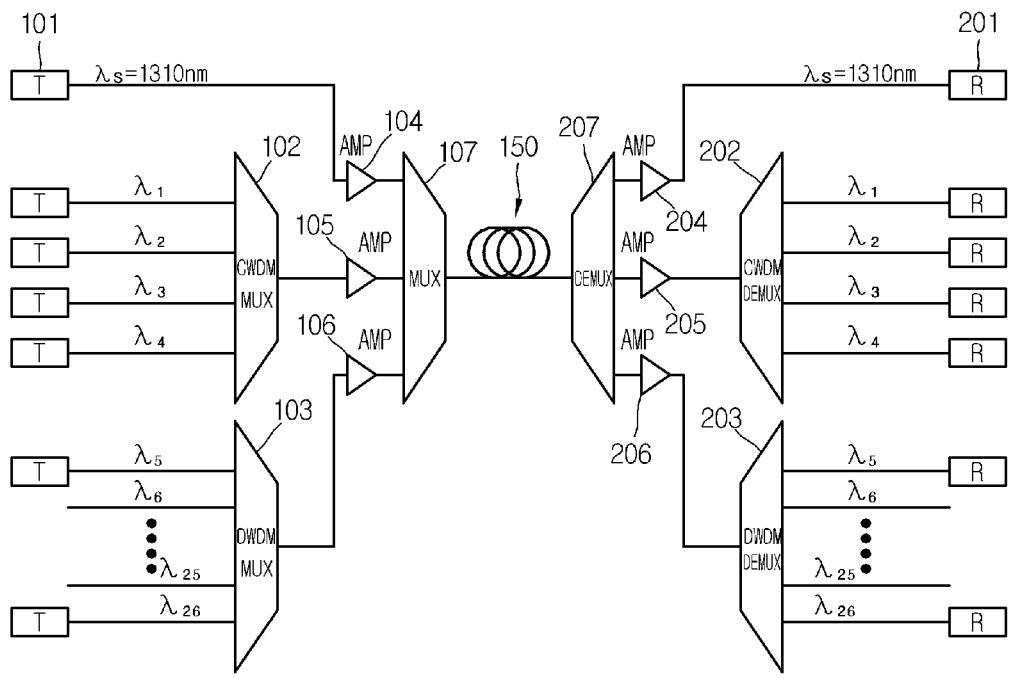

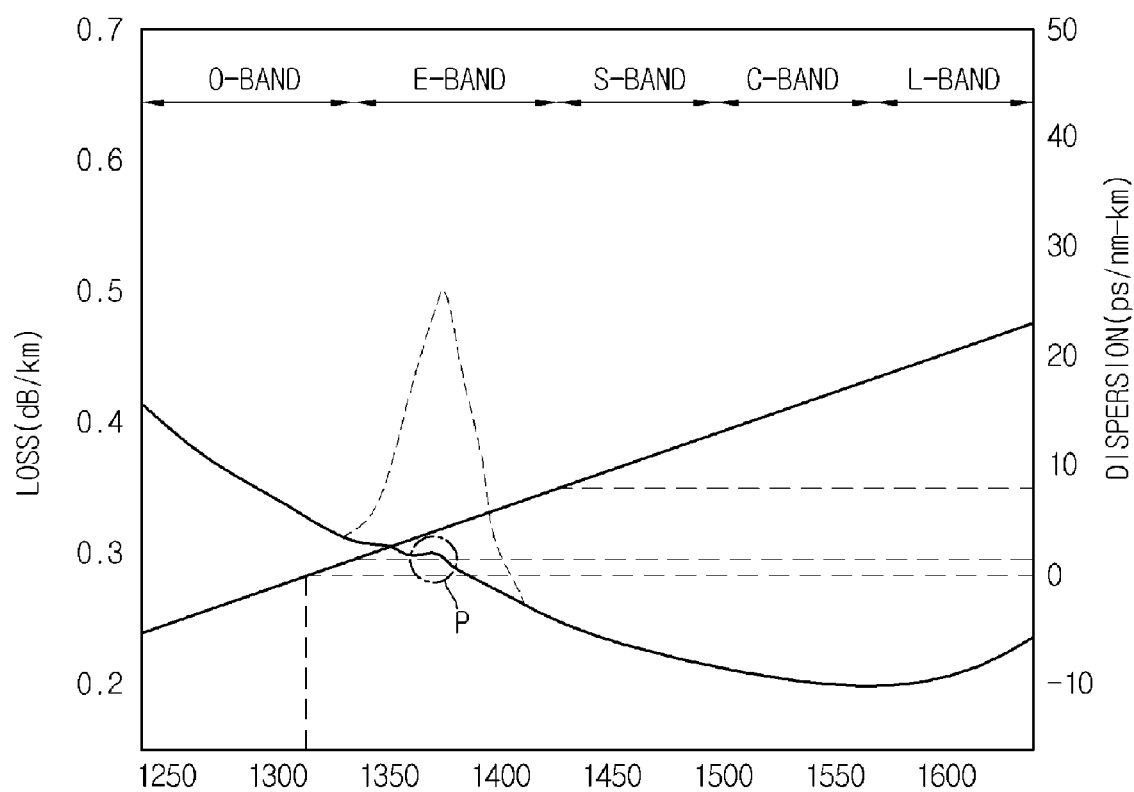
[Fig. 5]

OPTICAL TRANSMISSION SYSTEM FOR TRANSMITTING SIGNAL OF E-BAND WITH OTHER BANDS

TECHNICAL FIELD

The present invention relates to an optical transmission system, more particularly an optical transmission system which may give an effect of expanding a transmission bandwidth by multiplexing optical signals of an E-band and other bands to transmit both optical signals simultaneously through one optical fiber, and also may have superior compatibility with the existing transmission systems and simple configuration of the device, thereby constructing an optical network at an inexpensive cost.

BACKGROUND ART

In an optical transmission technique using a wavelength division multiplexing (WDM), a plurality of optical signals of wavelength channels are multiplexed and then transmitted through a single optical fiber. Accordingly, it is anticipated that the WDM technique will be prevailed as one of major optical communication techniques in the near future because it is more cost-effective to apply additional wavelengths than install additional cables and it is suitable for high-capacity high-speed network.

Generally, the optical transmission system supporting the WDM efficiently uses limited optical wavelength channels for multiplexing and demultiplexing optical signals by means of a predetermined wavelength division multiplexing element provided in the optical transmission system. Recently, the multiplexing techniques, for example a coarse wavelength division multiplexing (CWDM) and a dense wavelength division multiplexing (DWDM), which have a more compact channel spacing, are now used as an optical transmission system according to the trend requiring high-capacity high-speed data transmission.

In the early WDM systems, only two wavelength ranges, for example 1,310 nm and 1,550 nm were used for the optical transmission, and a standard single mode optical fiber (i.e. a standard single mode fiber (SSMF)) was used as a transmission media. But since such early systems merely allot an upstream and downstream data to 1,310 nm and 1,550 nm, they were unsuitable for the high-capacity high-speed data transmission in the current level of 10 Gb/s, and limitedly used only for a passive optical network (PON) or the like.

In the case of the CWDM described later, the system was arranged to use a channel spacing of 20 nm as stated in ITU-T G.694.2, and to use an O-band (1,260 to 1,360 nm wavelength range) and a C-band (1,530 to 1,565 nm wavelength range) upon expansion of a local loop. In addition, the accessible wavelength ranges, for example an S-band (1,460 to 1,530 nm wavelength range), an L-band (1,565 to 1,625 nm wavelength range) and so on may be used in the CWDM, but an E-band (1,360 to 1,460 nm wavelength range) may substantially not suitable for transmission with the conventional SSMF due to at most 2 dB/km of high absorption loss by hydroxyl group (OH) existing in a wavelength near to 1,383 nm.

DWDM and CWDM are significantly different to each other in that DWDM has narrower channel spacing than CWDM. Generally, the channel spacing is normalized as an standard according to ITU-T G.694.1, for example 0.4 nm, 0.8 nm, 1.6 nm, 3.2 nm, etc. In general, the wavelength ranges of the C-band and the L-band were widely used in such DWDM, but the optical wavelength of the E-band may not used for transmission with the conventional SSMF due to high absorption loss peak by hydroxyl group (OH) as in the CWDM.

Meanwhile, in a paper "Fabrication of Completely OH-Free VAD Fiber" (Electronic Letters, 16(19), 1980), it is shown that it is important for SMF to satisfy G.652.C in a WDM system, but there were not described dispersion characteristics of the optical fiber for optical transmission of the E-band, as well as an information about channel allotment within loss spectrum for the optical fiber.

U.S. Pat. No. 5,680,490 discloses a splitting system which divides channels to transfer optical signals at multiple wavelengths using WDM by two steps. As an example, it was proposed that if 4 optical signals were transferred in the CWDM using an optical fiber, they were received in DWDM, allowing the 4 channels to be divided into a number of channels.

Also, U.S. Pat. No. 6,205,268 discloses a technique concerning a high-capacity optical fiber network that operates at the E-band. According to the patent, there is proposed an optical transmission system for inhibiting stimulated Raman scattering (SRS) interference between WDMs or analog signals and non-linear phenomena such as 4 phonon mixing (4 PM) between WDM signals, and also supporting WDM operation of 1.4 mm wavelength range (1,335 to 1,435 nm).

However, the transmission media, which may optimally maintain optical loss properties and dispersion characteristics at E-band, should be actually provided to use the channel wavelength signal of the E-band in the multiplexing technique. Also an elaborate and inexpensive transmission system, which may carry out a stable multiplexing operation even in CWDM or DWDM having a relatively narrower channel spacing than WDM, has been required. However, it was difficult to use the wavelength channels of the E-band together with those of other bands since both wavelength channels of the E-band and other bands might not be multiplexed together due to absence of such transmission system in the prior art. Therefore, the conventional transmission system has a problem that it is difficult to increase the data-transmitting capacity or construct a compatible optical network in a suitable manner.

DISCLOSURE OF INVENTION

Technical Problem

Therefore, it is an object of the present invention to provide optical transmission system capable of multiplexing all optical wavelength ranges and having superior compatibility with the existing optical networks by combining both optical signals of an E-band and other bands into a simple structure.

It is another object of the present invention to provide optical transmission system capable of inhibiting non-linear phenomena such as SRS interference or 4 PM and also transmitting a digital signal and an analog signal through one optical fiber at the same time.

Technical Solution

In order to accomplish the above object, the present invention provides an optical transmission system, which includes a first thin film filter for receiving optical signals of E-band and other bands at both sides thereof respectively, and multiplexing the optical signals of both E-band and other bands by selectively transmitting wavelength ranges received at one side, reflecting wavelength ranges received at the other side, and then coupling the optical signals of both E-band and other bands; an optical fiber for transmitting the optical signals multiplexed by the first thin film filter to a receiving portion;

and a second thin film filter for selectively separating and demultiplexing the E-band and other bands from the optical signals transmitted through the optical fiber.

Preferably, the first and second thin film filters selectively transmit only one band among O-band, S-band, C-band, E-band and L-band.

It is also preferred that the optical fiber has a zero dispersion value at a wavelength near 1,310 nm, a maximum loss at the E-band less than that at 1,310 nm, and a chromatic dispersion value of 1.5 to 8.0 ps/nm-km at the E-band.

Other bands may include one or more bands selected from the group consisting of O-band, S-band, C-band, E-band and L-band.

Also preferably, one channel selected in the E-band is used for monitoring optical transmission, and one channel selected in other bands is used for transmitting data.

In addition, it is also possible that a single channel signal is used in the E-band with a transmission rate between 50 Mb/s and 1.25 Gb/s, and one channel selected in one wavelength range or at least two channels selected in at least two wavelength ranges are used as channel signals of other bands with a transmission rate between 1.25 Gb/s and 40 Gb/s.

In this present invention, the channel signals of the E-band may be used for monitoring transmission and the channel signals of other bands may be used for transmitting digital data or analog data, while channels of both bands may be multiplexed by means of CWDM or DWDM.

According to the present invention, at least two channel signals may be used in the E-band, and at least two channel signals selected in any wavelength range may be used in other bands, and each channel signal may have a transmission rate between 1.25 Gb/s and 40 Gb/s.

Preferably, a channel for digital data transmission is allotted to the E-band and a channel for analog data transmission is allotted to other bands, and channels of both bands are multiplexed by means of CWDM or DWDM.

As an alternative, it is also possible that a channel for analog data transmission is allotted to the E-band and a channel for digital data transmission is allotted to other bands, and channels of both bands are multiplexed by means of CWDM or DWDM.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a schematic view showing an optical transmission system according to a first embodiment of the present invention;

FIG. 2 is a schematic view showing an optical transmission system according to a second embodiment of the present invention;

FIG. 3 is a schematic view showing an optical transmission system according to a third embodiment of the present invention;

FIG. 4 is a detailed cross sectional view showing an example of multiplexing and demultiplexing operations shown in FIG. 3.

FIG. 5 is a diagram showing optical loss and dispersion properties of the optical fiber used in the optical transmission system according to a preferred embodiment of the present invention.

BEST MODE FOR CARRYING OUT THE INVENTION

Hereinafter, the preferred embodiments of the present invention will be described in detail with reference to the accompanying drawings. the terms used should not be construed as limited to general and dictionary meanings but based on the meanings and concepts of the invention on the basis of the principle that the inventor is allowed to appropriately define terms for the best explanation. Therefore, the description herein the scope of the invention be understood that other and modifications could be made thereto without departing from the spirit and scope of the invention.

FIGS. 1 to 3 schematically show embodiments of an optical transmission system according to the present invention.

Referring to the drawings, the optical transmission system of the present invention includes a first thin film filter 100 provided in a transmitting portion to carry out multiplexing operation between wavelength ranges; a second thin film filter 200 provided in a receiving portion to carry out demultiplexing operation; and an optical fiber 150 functioning as a transmitting line between the first thin film filter 100 and the second thin film filter 200.

The first thin film filter 100 is used as a band pass filter for selectively transmitting light of any specific wavelength range, which carries out multiplexing operation by receiving and coupling the optical signals of the E-band and other bands at both sides thereof. Here, other bands may include one or at least two bands selected from the group consisting of an O-band, an S-band, a C-band and an L-band.

Preferably, the first thin film filter 100 couples and multiplexes optical signals of both E-band and other bands by receiving and selectively transmitting optical signals of other bands at one side and receiving and reflecting optical signals of E-band at the other side. The first thin film filter 100 may employ common C-band pass filters if C-band is subject to multiplexing with E-band, and also employ S-band pass filter or L-band pass filter if S- or L-band is subject to multiplexing with E-band.

Similarly to the first thin film filter 100, the second thin film filter 200 is used as a band pass filter for selectively transmitting light of any specific wavelength range, which carries out demultiplexing operation by selectively separating optical signals of E-band and optical signals of other bands from the multiplexed optical signals transmitted from the first thin film filter 100 via a transmitting line.

According to the first thin film filter 100 and the second thin film filter 200 as described above, a transmitting capacity of digital and analog data may be increased by multiplexing and demultiplexing the optical signals of the E-band with respect to channel signals of various bands.

Specifically, FIG. 1 shows that any of channels selected from the E-band is used as a transmission-monitoring channel signal $\lambda_s$, and any of channels selected from other bands is used as a data transmitting channel $\lambda_1$. In this case, the second thin film filter 200 may be configured so that the channel signal $\lambda_s$ of the E-band used for monitoring transmission is divided by reflection, and the channel signals $\lambda_1$ of other bands are selectively transmitted.

In the transmission system of the present invention, the channel signal used to transmit data is not limited to the single signal, but the channel signal multiplexed into multiple channels may also be used as shown in FIG. 2. FIG. 2 shows that 22 channels corresponding to $\lambda_1$ to $\lambda_{22}$ multiplexed into DWDM. Here, multiplexing of the channel may be decided to be DWDM or CWDM depending on a desired number and cost of the channel.

In this case, channel spacing of DWDM may be set to for example 0.4 to 3.2 nm. In addition, the second thin film filter 200 may be configured so that the channel signal $\lambda_s$ of the E-band used to monitor transmission is divided by reflection, and channel signals $\lambda_1$ to $\lambda_{22}$ ther bands are selectively transmitted.

Considering general transmission standards of CWDM and/or DWDM, a signal transmission rate of E-band is preferably set to a range between 50 Mb/s and 1.25 Gb/s, and a signal transmission rate of other bands is preferably set to a range between 1.25 Gb/s and 40 Gb/s.

Also, the channel signal of the E-band is not limited to a signal used to monitor the transmission, but also it may be used for transmitting data as shown in FIG. 3. FIG. 3 shows that the channels of other bands corresponding to $\lambda_5$ to $\lambda_{26}$ are multiplexed into DWDM and then input to one side of the first thin film filter 100, while a transmission-monitoring channel signal $\lambda_s$ capable of being separated from $\lambda_5$ to $\lambda_{26}$ in the second thin film filter 200 and 4 data-transmitting channels $\lambda_1$ to $\lambda_4$ selected from the E-band and multiplexed into CWDM are input to the other side of the first thin film filter 100, and then multiplexed. In this case, channel spacing of DWDM may be set to for example 0.4 to 3.2 nm, and channel spacing of CWDM may be set to 20 nm. In addition, the second thin film filter 200 may be arranged so that the transmission-monitoring channel $\lambda_s$ corresponding to a wavelength near 1,310 nm and the data-transmitting channels $\lambda_1$ to $\lambda_4$ of the E-band are, for example, divided by reflection, and the channel signals $\lambda_5$ to $\lambda_{26}$ of other bands are selectively transmitted. Here, since the optical signal of the transmission-monitoring channel $\lambda_s$ is set to have a relatively low power compared to other channels, it can be easily separated from the data-transmitting channels $\lambda_1$ to $\lambda_4$ of the E-band with low cost, i.e. low isolation filter.

In case that at least 2 channel signals are used in the E-band, and at least 2 channel signals selected from any wavelength range are used in the channels of other bands as mentioned above, a signal transmission rate of each channel is preferably set to a range between 1.25 Gb/s and 40 Gb/s, considering the general transmission standards of CWDM and/or DWDM.

FIG. 4 shows an example of multiplexing and demultiplexing the channel signal of the E-band with those of other bands in an embodiment shown in FIG. 3, in more detail. In FIG. 4, a multiplexer 107 and a demultiplexer 207 correspond to the first thin film filter 100 and the second thin film filter 200, respectively.

Referring to FIG. 4, the channel signals $\lambda_1$ to $\lambda_4$ of the E-band output from a corresponding transmitting portion (T) are input to the multiplexer 107 made of the first thin film filter 100 via a Raman amplifier 105 preferably equipped at every 80 km in order to compensate for optical loss after multiplexing with CWDM MUX 102, and the channel signals $\lambda_5$ to $\lambda_{26}$ corresponding to other bands, for example a C-band, rather than the E-band are input to the multiplexer 107 via an erbium doped fiber amplifier (EDFA) 106 in order to compensate for optical loss after multiplexing with DWDM MUX 103, and then a multiplexing process is carried out. The transmission-monitoring channel signal $\lambda_s$ corresponding to 1,310 nm is preferably input to the multiplexer 107 through Raman amplifier 104, and then multiplexed together with the channel signals $\lambda_1$ to $\lambda_4$ and $\lambda_5$ to $\lambda_{26}$.

The optical signals multiplexed in the multiplexer 107 are transmitted to the receiving portion via the optical fiber 150, and then demultiplexed by isolation into each corresponding wavelength range using the demultiplexer 207 made of the second thin film filter 200. Specifically, the multiplexed optical signals is divided into a channel group consisting of $\lambda_s$, $\lambda_1$ to $\lambda_4$ and $\lambda_5$ to $\lambda_{26}$ by the demultiplexer 207, and the channel groups of $\lambda_1$ to $\lambda_4$ and $\lambda_5$ to $\lambda_{26}$ are again divided by means of CWDM DEMUX 202 and DWDM DEMUX 203 respectively, and input to the corresponding receiving portions (R). Here, a rear end of the demultiplexer 207 may be provided with the Raman amplifiers 204 and 205 and the erbium doped fiber amplifier 206 to amplify the signals of each channel group attenuated during their transmissions.

On the other hand, the optical fiber 150, which is provided between the first thin film filter 100 and the second thin film filter 200 to function as a transmitting line, preferably has properties as shown in FIG. 5, so as to transmit the optical signals of the E-band without any absorption loss by a hydroxyl group (OH). In FIG. 5, a peak region marked with a dotted line shows an absorption loss peak caused by hydroxyl groups (OH) present in a general optical fiber.

As shown in FIG. 5, the optical fiber used in the optical transmission system of the present invention may transmit the channel signal of the E-band without any optical signal loss by using SMF that has a dispersion value of zero near 1,310 nm, a smaller maximum loss (see P position) at the E-band than that at 1,310 nm wavelength, and a chromatic dispersion value of 1.5 to 8.0 ps/nm-km at the E-band. The optical fiber may be manufactured using known methods such as MCVD, VAD, OVD, etc.

Hereinafter, operation of the optical transmission system according to a preferred embodiment of the present invention will be described in detail.

The optical transmission system according to the present invention transmits optical signals of both E-band and other bands by carrying out multiplexing and demultiplexing operations using the first thin film filter 100 and the second thin film filter 200 provided in the transmitting and receiving portions, respectively, via the optical fiber 150. Such an optical transmission system according to the present invention may allot analog data and digital data to different wavelength ranges to be multiplexed and demultiplexed based on the thin film filters 100 and 200 as their starting points, thereby being capable of inhibiting non-linear phenomena such as SRS interference or 4 PM.

More specifically, the multiplexing operation is substantially carried out in the first thin film filter 100 by receiving and selectively transmitting single or multiple channel signals of bands other than E-band from the corresponding transmitting portion (T) at one side, and also by receiving and reflecting a channel signal of the E-band at the other side to be coupled to the channels of other bands. Here, the channel signal of the E-band may be use for monitoring the transmission as well as transmitting data.

Each of the channel signals multiplexed by the first thin film filter 100 may be a signal multiplexed by means of DWDM having a channel spacing of 0.4 to 3.2 nm, or a signal multiplexed by means of CWDM having a channel spacing of 20 nm. For example, if the first thin film filter 100 and the second thin film filter 200 are configured using a C-band pass filter, a signal in which 4 channels of $\lambda_1$ to $\lambda_4$ are multiplexed by means of DWDM, may be used as the channel signal of the E-band, and a signal in which channel groups of $\lambda_5$ to $\lambda_{26}$ corresponding to the C-band are multiplexed by means of DWDM, may be used as the channel signals of other bands.

The multiplexed channel signals $\lambda_5$ to $\lambda_{26}$ are compensated for absorption loss with passing through an optical amplifier, for example EDFA, and then selectively pass through the first thin film filter 100. And the multiplexed channel signals $\lambda_1$ to $\lambda_4$ are compensated for absorption loss by means of the Raman amplifier together with the transmission-monitoring channel $\lambda_s$, input to and reflected from the first thin film filter 100, and then coupled with the channels $\lambda_5$ to $\lambda_{26}$.

The signal multiplexed in the first thin film filter 100 is transmitted to the receiving portion via one optical fiber 150 corresponding to SMF that may prevent absorption loss for the E-band, and then demultiplexed by the second thin film filter 200.

The demultiplexing operation is carried out in the second thin film filter 200, as in the first thin film filter 100, by separating the wavelength ranges in such a manner of selectively transmitting the channel signals $\lambda_5$ to $\lambda_{26}$ corresponding to the C-band and selectively reflecting the transmission-monitoring channel $\lambda_s$ and the channel signals $\lambda_1$ to $\lambda_4$ of the 4 channel data. Subsequently, the wavelength ranges separated as above are again demultiplexed based on each channel and input to the receiving portion 201 by means of CWDM DEMUX 202 or DWDM DEMUX 203 preferably equipped in the rear end.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

According to the present invention, there is provided the optical transmission system that may multiplex and demultiplex a channel signal of the E-band with channel signals of other bands by using the thin film filter with a simple structure. Therefore it is possible to increase accessible channel resources and reduce a manufacturing cost due to simple arrangement of the optical transmission system.

Also in the optical transmission system according to the present invention, it is possible to transmit analog and/or digital signals simultaneously with one optical fiber at a high speed without crosstalk or non-linear phenomena such as SRS and 4 PM, since the E-band may be allotted to transmit the digital signal and other bands may be alloted to transmit the analog signal such as a TV signal.

The present invention as described above has advantages that additional optical networks may be constructed with low expenses and a complete compatibility with the conventional WDM system constructed by SSMF is ensured.

The invention claimed is:

1. An optical transmission system, comprising:
   a first thin film filter for receiving optical signals of E-band and other bands at both sides thereof respectively, and multiplexing the optical signals of both E-band and other bands by selectively transmitting wavelength ranges received at one side, reflecting wavelength ranges received at the other side, and then coupling the optical signals of both E-band and other bands;
   an optical fiber for transmitting the optical signals multiplexed by the first thin film filter to a receiving portion, the optical fiber having a zero dispersion value at a wavelength near 1,310 nm, a maximum loss at the E-band less than that at 1,310 nm, and a chromatic dispersion value of 1.5 to 8.0 ps/nm-km at the E-band; and
   a second thin film filter for selectively separating and demultiplexing the E-band and other bands from the optical signals transmitted through the optical fiber,
   wherein the optical signals of the E-band are input to one side of the first thin film filter as multiplexed signals by means of CWDM or DWDM,
   wherein the first thin film filter receives at one side optical signals multiplexed by means of CWDM and at the other side optical signals multiplexed by means of DWDM and then carries out the multiplexing, and the second thin film filter separates the optical signals multiplexed by means of CWDM and the optical signals multiplexed by means of DWDM from each other and then carries out the demultiplexing.

2. The optical transmission system according to the claim 1,
   wherein the first and second thin film filters selectively transmit only one band among O-band, S-band, C-band, E-band and L-band.

3. The optical transmission system according to claim 1 wherein said other bands include one or more bands selected from the group consisting of O-band, S-band, C-band, E-band and L-band.

4. The optical transmission system according to the claim 3,
   wherein one channel selected in the E-band is used for monitoring optical transmission, and one channel selected in other bands is used for transmitting data.

5. The optical transmission system according to the claim 3,
   wherein a single channel signal is used in the E-band with a transmission rate between 50 Mb/s and 1.25 Gb/s, and
   wherein one channel selected in one wavelength range or at least two channels selected in at least two wavelength ranges are used as channel signals of other bands with a transmission rate between 1.25 Gb/s and 40 Gb/s.

6. The optical transmission system according to the claim 5,
   wherein the channel signals of the E-band are used for monitoring transmission and the channel signals of other bands are used for transmitting digital data or analog data.

7. The optical transmission system according to the claim 3,
   wherein at least two channel signals are used in the E-band, and at least two channel signals selected in any wavelength range are used in other bands, and
   wherein each channel signal has a transmission rate between 1.25 Gb/s and 40 Gb/s.

8. The optical transmission system according to the claim 7,
   wherein a channel for digital data transmission is allotted to the E-band and a channel for analog data transmission is allotted to other bands.

9. The optical transmission system according to the claim 7,
   wherein a channel for analog data transmission is allotted to the E-band and a channel for digital data transmission is allotted to other bands.

* * * * *